United States Patent
Lafage et al.

(10) Patent No.: US 7,200,547 B2
(45) Date of Patent: Apr. 3, 2007

(54) METHOD OF PROCESSING BINARY PROGRAM FILES

(75) Inventors: Thierry Lafage, Paris (FR); Geraud Plagne, Nanterre (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 757 days.

(21) Appl. No.: 10/350,938

(22) Filed: Jan. 24, 2003

(65) Prior Publication Data
US 2003/0177167 A1 Sep. 18, 2003

(30) Foreign Application Priority Data
Jan. 30, 2002 (FR) .................................. 02 01085

(51) Int. Cl.
*G06F 9/455* (2006.01)
(52) U.S. Cl. .................. 703/26; 717/153; 717/113; 702/42; 709/321
(58) Field of Classification Search .................. 703/26; 717/113, 153, 147; 375/240.12; 702/42; 307/42; 712/205; 709/321; 725/136; 370/229, 370/537; 704/233
See application file for complete search history.

(56) References Cited

U.S. PATENT DOCUMENTS

| | | | |
|---|---|---|---|
| 5,819,067 A | 10/1998 | Lynch | 395/500 |
| 5,887,243 A * | 3/1999 | Harvey et al. | 725/136 |
| 6,609,248 B1 * | 8/2003 | Srivastava et al. | 717/147 |
| 6,662,356 B1 * | 12/2003 | Edwards et al. | 717/113 |
| 6,823,010 B1 * | 11/2004 | Curet et al. | 375/240.12 |
| 6,973,560 B1 * | 12/2005 | Rice et al. | 712/205 |
| 7,002,974 B1 * | 2/2006 | Deerman et al. | 370/401 |
| 2001/0007570 A1 * | 7/2001 | Mangin | 370/537 |
| 2002/0057018 A1 * | 5/2002 | Branscomb et al. | 307/42 |
| 2002/0103942 A1 * | 8/2002 | Comeau | 709/321 |
| 2002/0105905 A1 * | 8/2002 | Boyle et al. | 370/229 |
| 2002/0111804 A1 * | 8/2002 | Choy et al. | 704/233 |
| 2003/0030004 A1 * | 2/2003 | Dixon et al. | 250/370.09 |
| 2003/0088860 A1 * | 5/2003 | Wang | 717/153 |
| 2003/0093780 A1 * | 5/2003 | Freudenberger et al. | 717/153 |
| 2005/0143938 A1 * | 6/2005 | Schulze et al. | 702/42 |

FOREIGN PATENT DOCUMENTS

| | | |
|---|---|---|
| ER | 0866612 A1 | 9/1998 |
| ER | 1168721 A1 | 1/2002 |

* cited by examiner

*Primary Examiner*—Kamini Shah
*Assistant Examiner*—Kandasamy Thangavelu

(57) ABSTRACT

A device and method for processing binary program files includes transferring a binary program file in the form of binary data packets over a communication network between a transmission device of a server platform and a reception device of a target platform. The reception device reorders the packets suitable for forming reordered-packet groups. A processor successively analyzes the reordered-packet groups so as to identify portions of code and processes the analyzed packets as soon as a portion of code has been identified.

7 Claims, 1 Drawing Sheet

METHOD OF PROCESSING BINARY PROGRAM FILES

FIELD OF THE INVENTION

The present invention relates to a method of processing binary program files, comprising a step of transferring a binary program file in the form of binary data packets over a communication network between a transmission device of a server platform and a reception device of a client platform, referred to below as a target platform.

It also relates to a data-processing device which is suitable for receiving binary program files transmitted over a communication network in the form of binary data packets by a transmission device of a server platform.

It may be used, in particular, for the binary translation of binary program files compiled for a source platform into binary program files compiled for a target platform, a source platform being, for example, a games console, and a target platform being, for example, a digital television receiver-decoder also called "set-top box", a personal digital assistant or a mobile telephone.

BACKGROUND OF THE INVENTION

The downloading of a binary program file compiled for a source platform via a communication network, with a view to running it on a different target platform, is divided into three main steps:
- the actual downloading of the binary program file, from the communication network,
- the binary translation of the binary program file in order to provide a version of it which is compiled for the target platform, and
- the running of the binary program file translated in this way.

U.S. Pat. No. 5,819,067 proposes to use a system with two processors for the binary translation and running of a binary program file. One processor is dedicated to the binary translation, and the other to running the translated binary program file. The first processor starts by translating a first page of the binary program file. It then translates a second page and, during this time, the second processor runs the first page. This system hence makes it possible to run the binary program file as it is being translated.

In spite of this, the binary program file may occupy a large memory space, ranging from a few hundred kilobytes to a few dozens of megabytes. Consequently, the downloading via the communication network may take many minutes, and the user has to wait for a long time until the binary program file is usable.

SUMMARY OF THE INVENTION

It is an object of the present invention to provide a method of processing binary program files which is faster.

To that end, the method of processing binary program files is characterized in that it furthermore comprises:
- a step of reordering the packets, which is suitable for forming reordered packet groups,
- a processing step, which is suitable for successively analyzing the reordered packet groups so as to identify portions of code, the steps of transfer, reordering and processing being suitable for being carried out in parallel.

The present invention makes it possible to start the processing of the binary program file (this processing being, for example, binary translation) as soon as a portion of code has been identified. The downloading of the binary program file, on the one hand, and the processing of the binary program file (for example, the binary translation and the running of the binary program file) by the reception device, on the other hand, are carried out according to a pipeline principle. The method of processing binary program files consequently makes it possible to process the binary program files more rapidly than the prior art, for the user's greater convenience.

The present invention also relates to a data processing device which is suitable for receiving binary program files and of implementing the method of processing binary program files, for example in an integrated circuit, with the aid of hardware or software means.

BRIEF DESCRIPTION OF THE DRAWINGS

These and other aspects of the invention are apparent from and will be elucidated with reference to the embodiments described hereinafter.

In the drawings.

DESCRIPTION OF PREFERRED EMBODIMENTS

Figure 1:
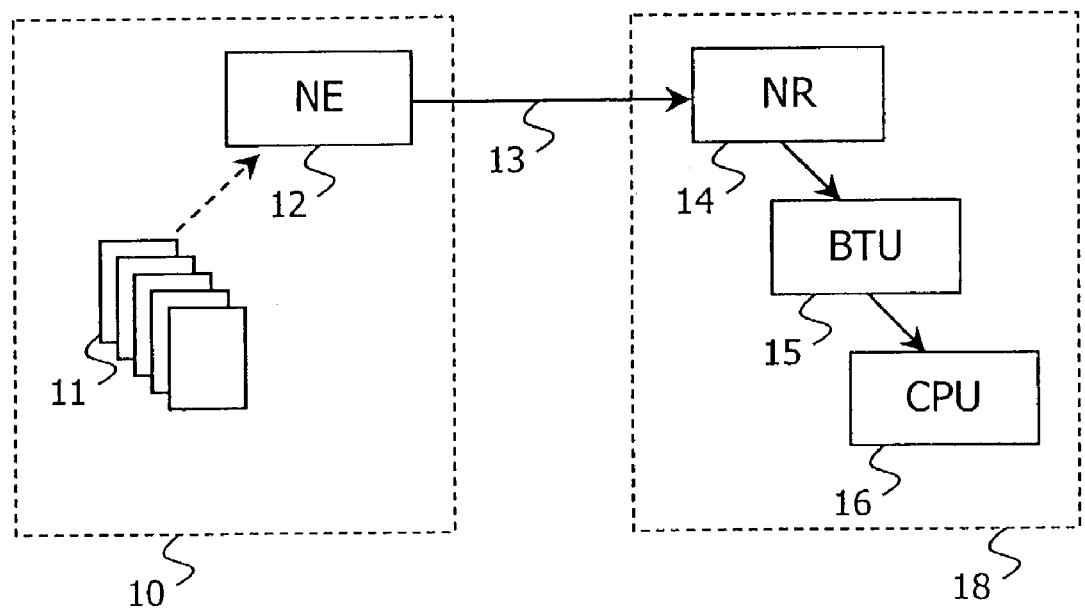
FIG. 1 represents a communication system for binary program files according to the invention.

The present invention relates to a system for communication between a server platform and a target platform, as illustrated in FIG. 1. The target platform is, for example, a digital television receiver-decoder, a personal computer, a personal digital assistant or a mobile telephone. Said system is suitable for transferring binary program files from a transmission device NE (12) of the server (10) to a reception device (14) of the target platform (18), via a communication network (13). The target platform has binary translation means BTU (15) which are suitable for translating the binary program file (11) transmitted by the server into a binary program file which can be run on the target platform, that is to say, which is compiled according to the operating system and/or the processor CPU (16) of said platform.

Figure 2:
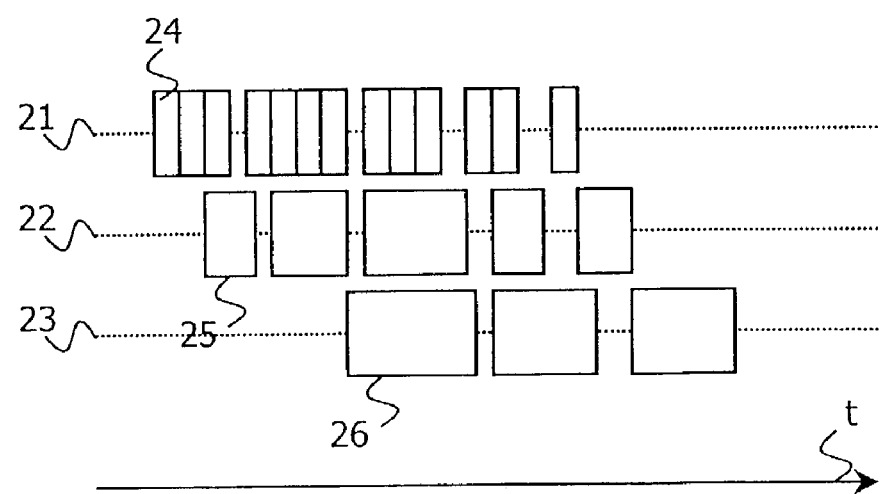
FIG. 2 represents a timing diagram of the various steps of the method of processing binary program files according to the invention.

The present invention comprises starting the binary translation and running the binary program file which is transferred as soon as possible, without waiting for the end of the transfer of said file. The invention is based on the fact that the files are transferred several packets at a time in communication networks which operate according to the TCP/IP protocols (Transmission Control Protocol/Internet Protocol), the two communication protocols which form the foundations of the Internet. Some of the content of a binary program file being transferred is hence available before the transfer of the whole binary program file has been completed. To that end, the method of processing binary program files according to the invention comprises the three main steps whose implementation as a function of time (t) is illustrated in FIG. 2.

During a first step (21), a binary file selected by a user of the target platform is transferred several packets at a time— the packets (24) may be of different size—from the transmission device of the server platform to the reception device of the target platform, via the communication network. The transfer protocol which is used is preferably the FTP protocol ("File Transfer Protocol"). It may also be the HTTP protocol ("HyperText Transfer Protocol").

During a second step (22), the binary translation means BTU (15) start to process the binary program file as soon as the first data packet sent by the server has arrived. To that end, the target platform comprises storage means, for example a memory or a hard disk, which are suitable for storing the data packets, and the binary translation means are suitable for reading the content of the storage means periodically, according to a principle which is known to the person skilled in the art.

The reception device of the target platform according to the invention is suitable for reading the packets as they arrive. Since the file transfer protocol FTP does not require the packets to arrive in the same order as that in which they were sent, the reception device furthermore comprises reordering means which are suitable for reordering the packets into ordered packet groups (25), the size of these packets depending on the order of arrival of the packets. In order to optimize the method of processing binary program files, the reordering means preferably deliver the smallest possible reordered packet groups. It will, however, be apparent to the person skilled in the art that the packets may also arrive directly in order, for example as in the case of the transfer protocol IPv6. In this case, the role of the reordering means is to ensure that the packets are actually received in order.

When the first data packet sent by the transmission device is stored in the storage means, the first packet group comprising the first packet and possibly packets which are immediately subsequent to it and have been stored before it is delivered to the binary translation means BTU (15). Said means can then start the binary translation. In fact, most binary program files have a data structure whose processing (whatever it may involve) requires a decoding phase which is carried out continuously from the start to the end of the file, the information present at the start of the file describing the rest of the file. Among the main formats of binary program files which have such a data structure, the ELF, C0FF, IEEE695 or Intel OMF formats may be mentioned.

Such binary program files are divided into several sections. The first section contains general information about the file, such as a magic number for identifying the binary format type, the version and type of the file, its creation dale, or the size of the file. It also contains information about the subsequent sections, for example, the number of sections and their offset from the start of the file. On the basis of reading the first transmission packets, the binary translation means are hence suitable for preparing for reception of the rest of the binary program file, in particular by allocating the necessary memory spaces, and of constructing the data structures of said file. The subsequent sections contain code and variable data. When other packet groups are received, the binary translation means hence read the content of other sections, and detect portions of code inside these sections. When these portions of code are identified, the binary translation means prepare the data structures which are associated with them. The binary translation means includes a static translation unit and a dynamic translation unit. As soon as the start of the code is available, the static translation unit starts a static translation of the portions of code. The dynamic translation unit starts a dynamic translation as soon as an execution starting point has been identified inside the code.

In a third step (23), the instructions which have been translated are sent to a processor CPU (16) of the target platform, with a view to running them. In the preferred embodiment, the running of the binary program file also takes place as said file is being translated. After a set of translated instructions 26 has been run, there may sometimes be a certain delay before a new set of translated instructions is run, this delay being visible in FIG. 2. Said delay may be due to the fact that the binary translation means are in the process of translating the subsequent set of instructions, or are waiting for portions of code to translate.

It is possible to implement the method of processing binary program files in an integrated circuit with the aid of hardware or software means. In the latter case, a computer program contained in a programming memory may make the circuit carry out various steps of the method of processing binary program files which has been described above. The computer program may also be loaded into the programming memory by reading a data medium, for example, a disk which contains the computer program. The reading may also be carried out via a communication network, for example the Internet network. In this case, a service provider will make the computer program available to those interested.

Any parenthesized reference numeral in the present text should not be interpreted implying limitation. The verb "comprise" and its conjugations should also be interpreted in the broad sense, that is to say, as not excluding the presence not only of elements or steps other than those listed after said verb, but also of a plurality of elements or steps already listed after said verb and preceded by the word "a", "an" or "one".

The invention claimed is:

1. A method of processing binary program files, comprising the acts of:
   transferring a binary program file as packets over a communication network between a transmission device of a source platform and a reception device of a target platform,
   reading the packets as they arrive including sections containing information related to received sections of the binary program file and yet to be received sections of the binary program file,
   based on the information, reordering the packets to form reordered packets,
   successively analyzing the reordered packets so as to identify portions of code compiled for the source platform, the transferring, reordering and analyzing acts being carried out in parallel,
   wherein the analyzing act includes preparing for reception of the yet to be received sections of the binary program file including at least one of allocating memory and constructing data structures for the yet to be received sections,
   a first translating act and a second translating act translating the portions of code compiled for the source platform into target portions of code compiled for the target platform,
   performing the first translating act as soon as start of the code is available; and
   performing the second translating act as soon as an execution starting point inside the code has been identified.

2. The method of processing binary program files as claimed in claim 1, further comprising the act of running the target portions of code as soon as they have been translated.

3. A data-processing device for receiving binary program files transmitted over a communication network in the form of binary-data packets by a transmission device of a source platform said data-processing device comprising:
   storing means for storing data packets, reordering means for reordering the packets, as they arrive including sections containing information related to received sections of the binary program files and yet to be received sections of the binary program files, the reordering means reordering the packets to form reordered packets based on the information, processing means for successively analyzing the reordered packets so as to identify portions of code compiled for the source platform, the means for storage, reordering and processing being configured to operate in parallel, wherein the processing means are further configured to prepare for reception of the yet to be received sections of the binary program file including at least one of allocating memory and constructing data structures for the yet to be received sections, and the processing means comprise a binary translation unit for performing a first translation and a second translation for translating a portion of code compiled for the source platform into a portion of code compiled for the target platform, wherein the processing means are further configured to perform the first translation as soon as start of the code is available; and to perform the second translation as soon as an execution starting point inside the code has been identified.

4. The data-processing device as claimed in claim 3, wherein the processing means further comprise a processor, which is suitable for running the portion of code as soon as it has been translated.

5. A computer program product stored in a computer readable medium, the computer Program when executed by a processor is configured to perform the method as claimed in claim 1.

6. A method of processing binary program files, comprising the acts of:

transferring a binary program file as packets over a communication network between a transmission device of a source platform and a reception device of a target platform;

reading the packets as they arrive including sections containing information related to received sections of the binary program file and yet to be received sections of the binary program file;

based on the information, reordering the packets to form reordered packets;

successively analyzing the reordered packets so as to identify portions of code compiled for the source platform, the transferring, reordering and analyzing acts being carried out in parallel;

a first translating act and a second translating act translate the portions of code compiled for the source platform into target portions of code compiled for the target platform, performing the first translation as soon as start of the code is available; and performing the second translation as soon as an execution starting point inside the code has been identified.

7. A data-processing device for receiving binary program files transmitted over a communication network in the form of binary-data packets by a transmission device of a source platform said data-processing device comprising:

storing means for storing data packets;

reordering means for reordering the packets, as they arrive including sections containing information related to received sections of the binary program files and yet to be received sections of the binary program files, the reordering means reordering the packets to form reordered packets based on the information;

processing means for successively analyzing the reordered packets so as to identify portions of code compiled for the source platform, the means for storage, reordering and processing being configured to operate in parallel;

the processing means comprise a binary translation unit for performing a first translation and a second translation for translating a portion of code compiled for the source platform into a portion of code compiled for the target platform wherein the processing means are further configured to perform the first translation as soon as start of the code is available; and to perform the second translation as soon as an execution starting point inside the code has been identified.

* * * * *